UNITED STATES PATENT OFFICE.

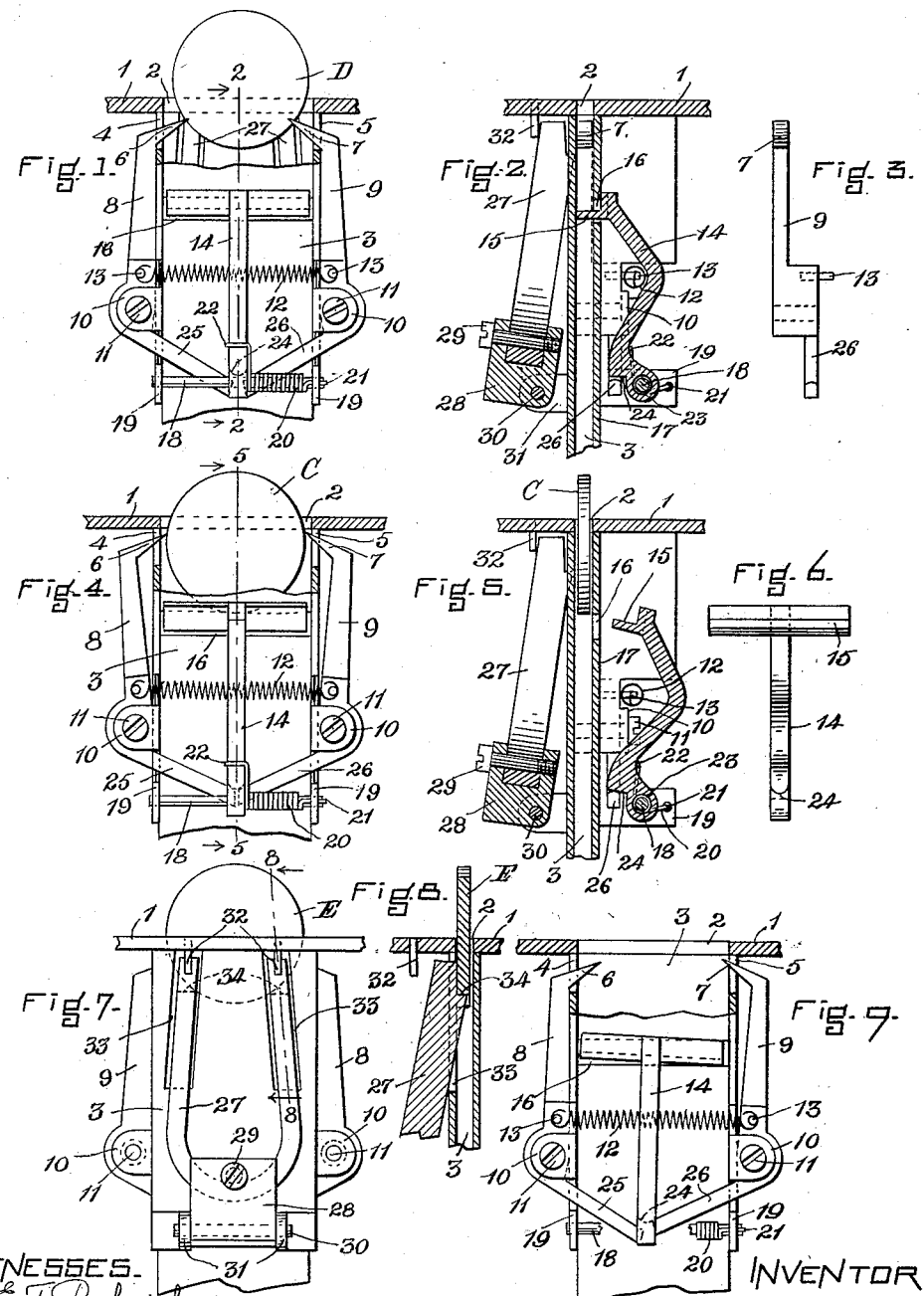

ALBERT D. GROVER, OF MALDEN, MASSACHUSETTS, ASSIGNOR TO AUTOSALES GUM AND CHOCOLATE COMPANY, OF NEW YORK, N. Y., A CORPORATION OF NEW YORK.

COIN-TESTING DEVICE FOR COIN-CONTROLLED MACHINES.

1,200,725. Specification of Letters Patent. Patented Oct. 10, 1916.

Application filed October 19, 1912. Serial No. 726,831.

*To all whom it may concern:*

Be it known that I, ALBERT D. GROVER, a citizen of the United States, and a resident of Malden, in the county of Middlesex, State of Massachusetts, have invented certain new and useful Improvements in Coin-Testing Devices for Coin-Controlled Machines, of which the following is a specification.

My invention relates generally to coin-operated machines, and has for its object the provision of a coin-testing device adapted to prevent any object except a hard disk of the proper diameter from entering the coin-slot of the machine.

One of the main difficulties experienced in the operation of all kinds of slot machines is the clogging of the coin-chute by the insertion of all kinds of material, such as paper, matches, tooth picks, nails—in fact anything that mischievously inclined persons can force through the coin-entrance slot.

It is the object of my invention to keep the coin-chute free at all times for the passage of a good coin by normally closing the coin-chute in close proximity to the coin-entrance slot, the arrangement being such that the coin-chute is automatically opened as a hard disk of proper diameter is pushed through the entrance-slot.

Broadly considered, my new coin-testing device includes adjustable means arranged to close the coin-chute near the coin-slot, and mechanism operable by a proper disk as it enters the slot to actuate the closing means into open position.

More specifically considered, my invention comprises in its preferred form a pair of levers having pointed ends which extend into the coin-chute in close proximity to the entrance-slot, so that disks of soft material are impaled upon the ends of the levers and thereby prevented from passing through the slot. The levers are so arranged that a disk of hard material moves the protruding ends of the levers out of the way. Associated with the coin-testing levers is a chute-closing member which for the sake of brevity I will call a gate. In its normal position, this gate closes the coin-chute at a point slightly beyond the projecting ends of the levers. The gate is adapted to be controlled by the levers, in such a way that when the levers are simultaneously operated by a disk of proper diameter, the gate is thrown open for the passage of the disk through the coin-chute. The connection between the gate and the levers is such that simultaneous operation of the levers is required to open the gate. As will appear later, this simultaneous operation of the levers can be effected only by a hard disk of the requisite diameter. In the preferred embodiment of my invention, I also provide means for positively preventing the passage of a magnetic disk through the coin-slot. This means comprises a movably mounted magnet having its poles arranged in such close proximity to the coin-slot, that an entering magnetic disk causes the magnet to move into a position to obstruct the disk against passing through the slot. By thus supplementing the action of the coin-testing levers and the gate, I provide a coin-testing device which allows only hard non-magnetic disks of the proper diameter to pass through the coin-entrance slot of the machine.

In the accompanying drawings, which illustrate the best embodiment of the invention now known to me, Figure 1, is an elevational view of my new coin-testing device, certain parts being shown in section for the sake of clearness. Fig. 2, is a section on line 2—2 of Fig. 1. Fig. 3, is a side view of one of the coin-testing levers. Fig. 4, is a view similar to Fig. 1, showing a proper coin in the act of being inserted into the slot. Fig. 5, is a section on line 5—5 of Fig. 4. Fig. 6, is a view in elevation of the chute-closing gate. Fig. 7, is a rear view of the coin-testing device, showing the magnet for holding magnetic disks against passing through the slot. Fig. 8, is a fragmentary sectional view on line 8—8 of Fig. 7, showing the magnet in position to stop an entering magnetic disk; and Fig. 9, is a view similar to Fig. 1, showing one of the testing levers in normal position and the other in operated position, to illustrate that the operation of a single lever does not move the gate into open position.

For the sake of clearness, the drawings show the device on an enlarged scale. As this device is adapted to be attached to any coin-operated machine, I have not deemed it necessary to show in the drawing any more than a portion or fragment 1 of a suitable casing or frame work. The portion 1 may, for instance, be part of the top plate of any coin-operated machine. The plate 1 is provided with a coin-entrance slot 2 which communicates with the coin-chute 3 secured in position by any suitable means. Immediately below the slot 2 the coin-chute 3 is provided with side openings 4 and 5 through which project the pointed ends 6 and 7, respectively, of the two coin-testing levers 8 and 9. The sides of the coin-chute are provided with lugs or ears 10 carrying the pins 11 on which the levers 8 and 9 are pivoted. The contractile spring 12, engaging at its ends the pins 13 carried by the levers 8 and 9, normally holds the latter in the postion shown in Fig. 1.

It is clear from Fig. 1 that when the levers 8 and 9 are in normal position, the pointed ends 6 and 7 obstruct the mouth of the coin-chute 3 against entrance of a disk, unless the disk is capable of forcing the ends 6 and 7 apart. It is obvious that if the disk D in Fig. 1 is of soft material, the pointed ends 6 and 7 will penetrate the disk as the same is pressed down and hold it against further entry into the slot. In other words, a disk of soft material becomes impaled upon the testing ends of the levers 8 and 9 before it has passed into the slot 2 to any great extent, so that the disk can be readily withdrawn by hand to clear the coin-slot. If the inserted disk is of hard material, the pointed ends 6 and 7 are forced apart as the disk is pushed into the coin-slot. Fig. 4 shows the levers 8 and 9 operated by the disk C which represents a proper coin.

The coin-chute 3 is normally closed by a gate 14 which has an extension 15 arranged to project into the coin-chute through the transverse opening 16 in the wall 17 of the chute. The gate 14 is at its lower end pivoted on the pin 18 mounted in lugs 19 extending from the sides of the coin-chute. The gate 14 is normally held in closing position, as shown in Fig. 2, by any suitable means—such as a spring 20 coiled about the rod 18 and at one end connected to one of the ears 19, as shown at 21, and at the other end bearing against the gate, as shown at 22. The hinge opening 23 in the gate 14 is sufficiently larger than the rod 18 to permit a slight lateral movement of the gate, for purposes to be presently explained. The gate 14 is provided with a rounded heel portion 24 adapted to be engaged by the free ends of the arms 25 and 26 extending inwardly from the lower ends of the levers 8 and 9.

The operation of the gate 14 by the arms 25 and 26 is as follows: When the levers 8 and 9 are rocked outwardly by a good coin, as shown in Fig. 4, the arms 25 and 26 engage at their free ends the heel 24 of the gate and move the same upwardly, thereby causing the gate to swing outwardly (toward the right as viewed in Fig. 5) into open position. This movement of the gate into open position, does not take place unless the levers 8 and 9 are operated simultaneously. Suppose that only one of the levers is operated, as for instance the lever 9. Referring to Fig. 9, it will be seen that when the arm 26 alone engages the heel 24 of the gate, the latter is not swung open but is merely shifted laterally on the rod 18, because the free end of the arm 26 slips out of operative engagement with the rounded heel 24. When both of the arms 25 and 26 engage the heel 24 simultaneously, no lateral shifting of the gate can take place and the gate is swung into open position. If, therefore, one should insert a nail or tooth pick into the slot in an attempt to pick the locking combination, he could only work one of the levers at a time, which would not move the gate out of closed position. Also, square pieces or pieces of irregular shape will not operate the levers 8 and 9 simultaneously and therefore cannot enter the coin-chute.

In order to prevent the entrance of hard magnetic disks of the proper diameter through the coin-chute 3, I provide a magnet 27 of the well known horse-shoe or U-shaped type. This magnet is at its lower end secured to a block 28 by screw 29 or otherwise. The block 28 is pivoted on the rod 30 carried by the ears or lugs 31 extending from the sides of the coin-chute 3. The block 28 also serves as a counterweight which holds the magnet in the position shown in Figs. 2 and 5, the upper ends of the magnet resting against the stop pins 32 extending from the plate 1. The rear wall of the coin-chute is provided with a pair of slots 33 in alinement with the legs of the magnet. The upper ends or poles of the magnet are provided with stop shoulders 34 which may be conveniently formed by cutting a portion away from the pole ends. When the magnet is in its normal or balanced position, the shoulders are out of the coin-chute and do not interfere with the passage of a non-magnetic disk therethrough. However, when a magnetic disk E is inserted into the slot 2, as shown in Figs. 7 and 8, the magnetic attraction draws the upper ends of the magnet toward the disk, so that the shoulders 34 project into the coin-chute and engage the entering disk E, thereby stopping it from further entrance into the coin-slot. The magnet 27 is so delicately balanced in its normal position that no matter how quickly the disk E is thrust into the coin-slot, the magnet is rocked into obstructing position before the lower portion of the disk can pass the shoulders 34. As soon as the magnetic disk is withdrawn from the slot, the weight 28 moves the magnet back into the position shown in Figs. 2 and 5.

It will be clear from the foregoing that my new coin testing device, while simple in construction and operation, positively prevents the clogging up of the coin-chute and allows only hard non-magnetic disks of prescribed diameter to pass through the coin-chute. My device is so compact that it may be readily attached to any coin-operated machine. It will of course be understood that a coin which passes beyond the gate 14 is guided by the coin-chute 3 to some suitable coin-controlled mechanism, which performs the desired function through the medium of the deposited coin.

While I have herein shown and described a specific form of construction, I would have it understood that I do not intend to be limited to the details set forth, as it is obvious that, in its broad aspect, my invention may be mechanically embodied in other forms than that set forth.

Having thus described my invention what I claim as new and desire to secure by Letters Patent is:

1. In a coin-testing device, the combination of a coin-chute having a coin-entrance slot, a movable device for normally closing said coin-chute in proximity to said slot, and a pair of movable members for actuating said device into open position, said members being adapted to be simultaneously operated by a proper coin entering said slot, the connections between said members and said device being such that the simultaneous operation of both members is necessary to move said device into open position.

2. In a coin-testing device, the combination of a coin-chute having a coin-entrance slot, a movable device for normally closing said coin-chute in proximity to said slot, and a pair of pivoted levers for actuating said device into open position, said levers being adapted to be simultaneously operated by a proper coin entering said slot, the connections between said levers and said device being such that the simultaneous operation of both levers is necessary to move said device into open position.

3. In a coin-testing device, the combination of a coin-chute having a coin-entrance slot, a hinged gate for normally closing said coin-chute in proximity to said slot, and a pair of movable members for actuating said gate into open position, said members being adapted to be simultaneously operated by a proper coin entering said slot, the connections between said members and said gate being such that the simultaneous operation of both members is necessary to move said gate into open position.

4. In a coin-testing device, the combination of a coin-chute having a coin-entrance slot, movable means for normally closing said coin-chute in proximity to said slot, a pair of levers having pointed ends extending into said coin-chute between said slot and said closing means, so that disks of soft material are impaled upon the ends of said levers and are prevented from passing through said slot, said levers being adapted to be simultaneously operated by a proper disk entering said slot, and means whereby the simultaneous operation of both levers is necessary to move said device into open position.

5. In a coin-testing device, the combination of a coin-chute having a coin-entrance slot, a pivoted gate arranged to close said coin-chute in proximity to said slot and provided with a heel portion near its pivot, said gate being slightly shiftable on its pivotal support, a pair of levers having pointed ends extending into said coin-chute between the gate and said slot, so that disks of soft material are impaled on said ends and prevented from passing through the slot, said ends being adapted to be moved out of the way by an entering disk of hard material, and inwardly extending arms on said levers for engaging the heel of said gate and moving the same into open position when said levers are simultaneously actuated, the operation of a single lever causing said gate to shift laterally on its pivot without swinging the same into open position.

6. In a coin-testing device, the combination of a coin-chute having a coin-entrance slot, a hinged gate for normally closing said coin-chute near the slot, a pair of levers mounted independently of said gate and adapted to move the same into open position, said levers being adapted to be simultaneously operated by a proper disk as it enters said slot, and coöperating means on said gate and said levers for compelling the simultaneous operation of said levers to open the gate.

7. In a coin-testing device, the combination of a coin-chute having a coin-entrance slot, a gate hinged at its rear end and having its forward end extending into said coin-chute in proximity to said slot, a pair of levers pivoted on opposite sides of said gate and adapted to be simultaneously operated by the entering coin, the rear ends of said levers being arranged to engage said gate near the point of pivot thereof, and means whereby the simultaneous engagement of said levers with said gate is necessary to cause movement of said gate into open position.

8. In a coin-controlled device, the combination of a coin-chute having a coin-entrance slot, a member for normally closing said coin-chute in proximity to said slot, a shaft on which said member is loosely mounted, a pair of independently mounted elements adapted to be simultaneously operated by the entering coin, and means whereby the simultaneous operation of said elements is necessary to move said member into open position.

9. In a coin-controlled device, the combination of a coin-chute having a coin-entrance slot, a member for normally closing said coin-chute, a pair of levers mounted independently of said member to actuate the same into open position, and coöperating means on said member and said levers whereby the simultaneous operation of said levers is necessary to move said member into open position.

10. In a coin-controlled device, the combination of a coin-chute having a coin-entrance slot, a member for normally closing said coin-chute, a shaft on which said member is loosely mounted, a rounded heel or shoulder provided on said member, and a pair of oppositely arranged actuating elements to engage said heel or shoulder, so that the simultaneous operation of said elements is necessary to actuate said member into open position.

In witness whereof, I hereunto subscribe my name this 30th day of September 1912.

ALBERT D. GROVER.

Witnesses:
 HARRY B. BENSON,
 C. H. SAWYER.

Copies of this patent may be obtained for five cents each, by addressing the "Commissioner of Patents, Washington, D. C."